US011715984B2

(12) United States Patent
Willacker et al.

(10) Patent No.: US 11,715,984 B2
(45) Date of Patent: Aug. 1, 2023

(54) CIRCUITRY ARRANGEMENT FOR AN ELECTRIC MOTOR/MACHINE

(71) Applicant: ZF FRIEDRICHSHAFEN AG, Friedrichshafen (DE)

(72) Inventors: Katja Willacker, Wiesentheid (DE); Christoph Wieder, Küps (DE); Jochen Wittmann, Burkardroth (DE); Roland Lindwurm, Sennfeld (DE); Ralf Wittstadt, Niederwerrn (DE); Daniel Schmitt, Bad Bocklet (DE); Matthias Cudok, Ritchenhausen (DE); Bernhard Byzio, Thundorf (DE); Alexander Schäflein, Ochsenfurt (DE); Marcus Van Heyden, Dittelbrunn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1037 days.

(21) Appl. No.: 16/113,748

(22) Filed: Aug. 27, 2018

(65) Prior Publication Data
US 2019/0068021 A1 Feb. 28, 2019

(30) Foreign Application Priority Data
Aug. 28, 2017 (DE) .......................... 102017214957.4

(51) Int. Cl.
*H02K 3/50* (2006.01)
*H02K 3/52* (2006.01)
(Continued)

(52) U.S. Cl.
CPC ................ *H02K 3/50* (2013.01); *H02K 3/24* (2013.01); *H02K 3/52* (2013.01); *H02K 5/225* (2013.01);
(Continued)

(58) Field of Classification Search
CPC ............ H02K 5/22; H02K 5/225; H02K 5/50; H02K 5/505; H02K 3/522; H02K 3/524;
(Continued)

(56) References Cited

U.S. PATENT DOCUMENTS

2007/0296292 A1* 12/2007 Kienzler ................ H02K 3/522
310/71
2009/0195092 A1* 8/2009 Gagnon ................... H02K 3/24
310/54
(Continued)

FOREIGN PATENT DOCUMENTS

DE 10 2009 045 551 5/2010
DE 10 2010 030 363 12/2011
(Continued)

OTHER PUBLICATIONS

Brose Fahrzeugteile, Stator of an Electric Motor with a Connection Unit, Dec. 22, 2015, DE 202014010565 (English Machine Translation) (Year: 2015).*
(Continued)

*Primary Examiner* — Alexander A Singh
(74) *Attorney, Agent, or Firm* — Cozen O'Connor (57) ABSTRACT

An electric machine has a plurality of phases. A winding is associated with each phase. An interconnection arrangement includes an annular carrier element with a plurality of axial cutouts, each for passage of a portion of a winding and a plurality of concentrically arranged, hollow-cylindrical switching rings. Each switching ring is adapted to contact a winding. The carrier element and the switching rings are adapted to radially positively engage one inside the other in an axial contact zone.

10 Claims, 9 Drawing Sheets

(51) Int. Cl.
*H02K 5/22* (2006.01)
*H02K 3/24* (2006.01)
*H02K 1/16* (2006.01)
*H02K 3/14* (2006.01)
*H02K 15/00* (2006.01)

(52) U.S. Cl.
CPC ............... *H02K 1/16* (2013.01); *H02K 3/14* (2013.01); *H02K 15/0062* (2013.01); *H02K 15/0087* (2013.01); *H02K 2203/09* (2013.01)

(58) Field of Classification Search
CPC ............ H02K 3/525; H02K 3/14; H02K 3/24; H02K 15/0087; H02K 15/0062; H02K 2203/09; H02K 3/50; H02K 3/505; H02K 3/52
USPC .......................................... 310/71, 214, 215
See application file for complete search history.

(56) References Cited

U.S. PATENT DOCUMENTS

| | | | |
|---|---|---|---|
| 2011/0215662 A1* | 9/2011 | Lee | H02K 3/38 310/71 |
| 2012/0104885 A1 | 5/2012 | Cominetti et al. | |
| 2013/0300232 A1* | 11/2013 | Jung | H02K 15/0087 310/71 |

FOREIGN PATENT DOCUMENTS

| | | | |
|---|---|---|---|
| DE | 10 2014 211 923 | 12/2015 | |
| DE | 202014010565 U1 * | 12/2015 | H02K 3/38 |
| DE | 20 2014 010 565 | 1/2016 | |
| JP | 2016-032392 | 3/2016 | |

OTHER PUBLICATIONS

Hasegawa Ayako, Stator of Dynamo-Electric Apparatus, Mar. 7, 2016, JP 2016032392 (English Machine Translation) (Year: 2016).*

* cited by examiner

CIRCUITRY ARRANGEMENT FOR AN ELECTRIC MOTOR/MACHINE

BACKGROUND OF THE INVENTION

1. Field of the Invention

The present invention is directed to an interconnection arrangement for an electric machine. The invention is directed in particular to an interconnection arrangement for electrically contacting winding portions of the electric machine.

2. Description of the Related Art

An electric machine comprises a stator and a rotor that are mounted so as to be rotatable opposite one another around a rotational axis. The stator comprises a plurality of plates that are axially stacked and have axial grooves in which conductor pieces of a winding are located. An electric current flowing through the conductor pieces is to be guided to electrical connections by an interconnection arrangement. Complicated contacting and conductor guides between the conductor pieces may be required for this purpose, and collector elements or distributor elements for electric currents can be difficult to manipulate.

JP 2016 032 392 A is directed to an interconnection arrangement for an electric machine with a hairpin winding. A winding of this kind includes a plurality of hairpin elements, which are substantially U-shaped conductor pieces, the ends of which can be inserted axially into a stator assembly, bent together and electrically connected to one another. A suggested interconnection arrangement comprises electric bus bars for connecting to the ends of the conductor pieces and a ring with axial recesses for passage of the conductor pieces. The interconnection arrangement can be fitted axially to the conductor pieces. Subsequently, the conductor pieces can be bent towards the ring and connected to one another and to the bus bars. The bus bars may interfere with the bending and contacting of the conductor pieces.

SUMMARY OF THE INVENTION

An object upon of the present invention is providing an improved interconnection arrangement for contacting an electric machine.

An electric machine has a plurality of phases, wherein a winding is associated with each phase. An interconnection arrangement includes an annular carrier element with a plurality of axial cutouts, each for passage of a winding, and a plurality of concentrically arranged, hollow-cylindrical switching rings, each switching ring being adapted to contact a winding. An outer circumferential and an inner circumferential surface of the annular carrier element are uninterrupted. The carrier element and the switching rings are adapted to radially positively engage one inside the other in an axial contact zone.

The arrangement of the switching rings separate from the carrier element makes it possible to assemble the two elements separately. In particular, a manufacturing step involving a portion of a winding can be carried out on the electric machine after arranging the carrier element because this portion of a winding can be accessed more easily. In particular, the manufacturing step can consist in bending portions of the winding. The switching rings can be arranged after this manufacturing step when the windings are ready to be electrically contacted. The electric machine can be constructed in particular as a permanently excited synchronous machine (PSM) that comprises a stator with the windings and a rotor with permanent magnets.

The cutouts of the carrier element can be adapted to allow axial ends of hairpin windings to pass through. If the winding of the electric machine is constructed as a hairpin winding, it comprises a plurality of substantially U-shaped hairpin elements that comprise in each instance two parallel conductor pieces and a connection area. The conductor pieces can be inserted into axial grooves or cutouts of a magnetic conducting element. Axially protruding portions of the conductor pieces can then be bent to guide predetermined conductor pieces to one another and electrically connect them to one another. The winding of a phase of the electric machine is completed in this way.

Hairpin elements usually have relatively large cross sections that can have a rectangular shape so as to fill the groove of the conducting element in an optimal manner so that required bending forces may be considerable. The carrier element can better absorb the bending forces of the hairpin elements and support them relative to one another.

The carrier element can have a plurality of axial grooves which extend, respectively, on a portion of a circumference around the rotational axis of the electric machine, wherein one of the switching rings has corresponding axial projections for engaging in the grooves. In other words, grooves lying on the same circumference around the rotational axis can be arranged in the carrier element. This could also be referred to as an annular groove with multiple discontinuities.

Every switching ring can carry axial projections on a circumference around the rotational axis, which axial projections can be received in the grooves or in the portions of the annular groove in the carrier element. Accordingly, the switching ring can be held by the positive engagement between the projections and the grooves in radial direction and preferably also in circumferential direction. The projections of the switching ring can form a kind of crown whose tines are formed by the projections and extend axially between a first rotational plane and second rotational plane such that the tines have identical axial limits at the top and bottom. The projections preferably have axial flanks rather than sloping flanks and, further preferably, the projections are evenly distributed along the circumference. The selected distribution can also ensure that the switching ring can only be inserted into the grooves in a single rotational position so as to rule out an erroneous rotational position during assembly ("poka-yoke" or inadvertent error prevention).

Grooves with which radially adjacent switching rings are associated can be offset in circumferential direction such that the projections of the switching rings do not overlap in radial direction. In this way, it can be ensured that the projections of the inner switching ring and outer switching ring are supported in radial direction with sufficiently wide webs of the carrier element. The stability of the arrangement can be enhanced. A radial deformation of a switching ring which could lead to a short circuit can be made less likely.

The grooves and the portions of the annular groove are preferably distributed in circumferential direction such that between adjacent projections of radially adjacent switching rings in circumferential direction there is a predetermined portion of the carrier element in circumferential direction in which there are no grooves. To this end, between two adjacent projections of the same switching ring, there is preferably a distance in circumferential direction that is greater than the extension of a projection of the switching ring located farther inside or farther outside in circumferential direction. The space remaining between a projection of the one switching ring and a projection of the adjacent switching ring can contribute to the support of the switching rings. If there are more than two switching rings, the groove-free portion is preferably radially continuous, i.e., extends in radial direction over all three switching rings.

The carrier element can have a plurality of radial channels for the passage of a fluid. The fluid can be a gas or a liquid which can be moved through the channels for cooling the electric machine, particularly at the axial end of the interconnection arrangement. In one embodiment form, the channels are radially funnel-shaped, and the cross sections of the channels can increase proceeding from inside to outside. The channels can be limited by the switching ring in an axial direction. For this purpose, the carrier element can be axially open at a side facing the switching rings in the region of the channels. A distribution of channels and intermediate portions between the channels can be independent from a distribution of axial projections at one of the switching rings.

The interconnection arrangement can comprise a cover element for axially contacting an axial end of the switching rings, which is remote of the carrier element, and the cover element and switching rings can be adapted to radially positively engage one inside the other. To this end, an arrangement of projections and grooves such as has been described between the switching rings and the carrier element can be implemented in particular.

A distribution of the projections and intermediate spaces in circumferential direction can also be less fine or more fine than the distribution on the other axial side of the switching rings.

A further switching ring can be provided for the contacting of a winding of the electric machine. The further switching ring is configured for arranging radially inside of the cover element, if provided. The further switching ring can be received in the plane of the cover element so as to save space.

In a particularly preferred embodiment form, there are three switching rings connected in pairs to three phases of the electric machine. Windings of the three phases can be electrically connected to one another in a star shape, and the star point at which all three windings are contacted with one another can be guided to the further switching ring. This contact is also called the neutral phase, and the further switching ring can be called the neutral switching ring.

An electric machine preferably comprises the interconnection arrangement described herein. The electric machine can comprise in particular an electric drive motor, for example, for a traction drive and preferably for a motor vehicle. The electric machine can realize a continuous power in operation of approximately 70-100 kW. A short-term peak output can be approximately 50% over this value. The electric machine can be optimized with respect to its power density or its power/weight ratio.

A process for assembling an interconnection arrangement in an electric machine with a plurality of phases, where a winding is associated with each phase, includes the steps of: axially fitting an annular carrier element to axial portions of the winding such that the axial portions extend through cutouts of the carrier element; bending the axial portions of the winding in circumferential direction; axially fitting a plurality of hollow-cylindrical switching rings concentrically with respect to the carrier element; and electrically connecting each switching ring to axial portions of an associated winding.

The interconnection arrangement can include the herein-described in particular. The axial portions of the switching rings can be fixed in the corresponding grooves by bonding engagement, for example, by a multicomponent adhesive. The adhesive is preferably temperature-resistant up to approximately 100-180° C. and, further, preferably resistant to acid and/or oil.

The carrier element can act in a stabilizing manner during the bending process in that the portions are bent after arranging the carrier element. At the same time, good access to the portions can be realized because the switching rings have not yet been installed at this point in time. The electrical connection can be carried out, for example, by welding, particularly by electric welding or laser welding. The ends of the winding which are to be welded preferably extend in axial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail with reference to the accompanying figures.

DETAILED DESCRIPTION OF THE PRESENTLY PREFERRED EMBODIMENTS

Figure 1:
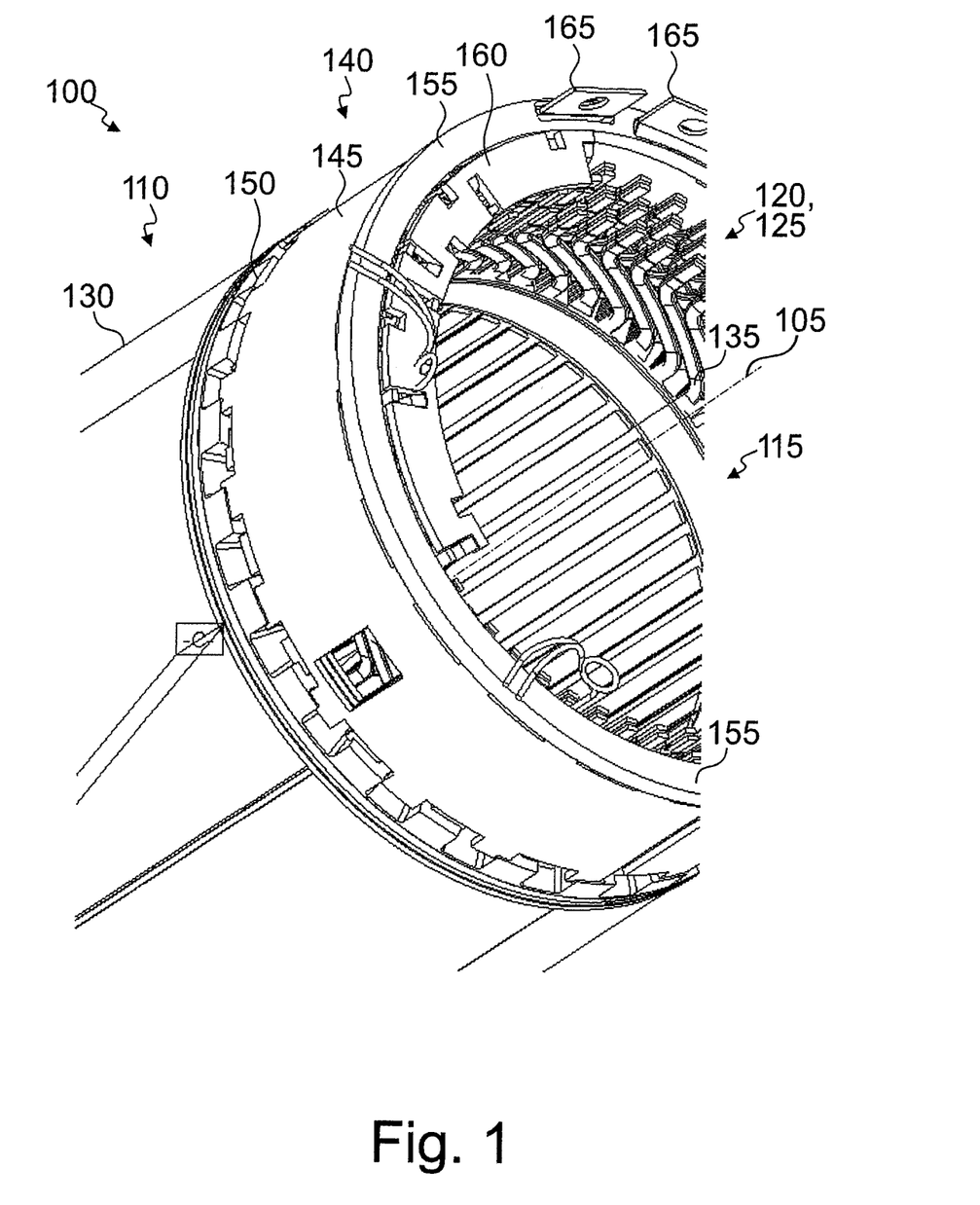
FIG. 1 is an exemplary electric machine.

FIG. 1 shows an exemplary electric machine 100 that has a rotational axis 105 around which is arranged a stator 110 opposite a rotatably mounted rotor 115 (not shown). In the present document, polar specifications always refer to the rotational axis 105 of the electric machine 100 unless otherwise indicated. The machine 100 is constructed, for example, as a permanently excited synchronous machine with stator 110 located on the radially outer side and rotor 115 located on the inner side. Other embodiment forms are also possible.

A plurality of windings 120, which are associated, respectively, with one of three phases 125 are arranged at stator 110. The windings 120 are preferably constructed as hairpin windings with hairpin elements 135. A hairpin element 135 is bent in a substantially U-shaped manner and comprises two conductor pieces which are spaced apart from one another and a bending portion located therebetween. The conductor pieces are inserted in various axial grooves of a magnetic conducting element 130, which can be constructed in particular as axially stacked plates, so that the ends of the conductor pieces protrude on one axial side. The ends are then usually bent simultaneously, specifically in such a way that predetermined ends can be brought into contact with one another. The bending is usually carried out in circumferential direction around rotational axis 105 and preferably also in a radially outer direction. After bending, ends of the hairpin elements 135 which are associated with one another can be electrically connected to one another, for example, by welding.

An interconnection arrangement 140 preferably includes a switching ring 145 for each phase 125 or winding 120. A plurality of switching rings 145 are positioned concentric to one another with reference to rotational axis 105. The switching rings 145 are made from an electrically conductive material and are optionally electrically insulated at their surfaces by a coating or paint, for example, Araldite. The switching rings 145 preferably have substantially the shape of a hollow cylinder in each instance, and the radial thickness of the switching rings 145 is smaller than the axial extension of the switching rings 145 by at least one order of magnitude. The switching rings 145 can be closed in circumferential direction. Alternatively, at least one of the switching rings 145 can also be open on one side such that it comprises two ends facing one another in circumferential direction and as a whole does not cover the entire full circle. All of the switching rings 145 can be formed according to this variant. In yet another embodiment form, two or more switching rings 145 are provided on the same circumference, every switching ring 145 covers only a partial area of the full circle, and different switching rings 145 can be associated with different phases 125.

An annular carrier element 150 is located at an axial end of the interconnection arrangement 140 facing the magnetic conducting element 130. The annular carrier element 150 can be produced from an electrically insulating material, in particular a thermosetting plastic or thermoplastic, for example, PEEK, PA, PBT, PPA, PPS, or an elastomer. A cover element 155 is preferably located at an opposite axial end of the interconnection arrangement 140. The switching rings 145 are preferably arranged in radial direction and/or in circumferential direction at the carrier element 150 and possibly also at cover element 155. Further preferably, there is a positive engagement at one or both sides as will be explained in more detail in the following. In addition or alternatively, a bonding engagement can also be provided, for example, by an adhesive. A neutral switching ring 160, which is usually located radially inside of the cover element 155, can be arranged at the axial end of the switching rings 145 remote of the magnetic conducting element 130. The neutral switching ring 160 can extend on a portion of a circular ring in circumferential direction around rotational axis 105, its radial extension usually being substantially greater than an axial thickness. The neutral switching ring 160 can also be divided in two and comprise two portions of a circular ring as will be described in more detail in the following.

The switching rings 145 are to be electrically connected in each instance to associated windings 120. Windings 120 can be interconnected in a star-shaped manner, and a star point at which the windings 120 are connected to one another can be electrically guided to the further switching ring 160. To this end, the switching rings 145, 160 can have contact elements which can extend in particular radially and/or axially in direction of the ends of the hairpin elements 135. Electrical connections 165 of the electric machine 100 can be formed at the switching rings 145, 160 or can be connected to the latter. With appropriate wiring, the machine 100 can be used as a drive motor or as a generator.

Figure 2:
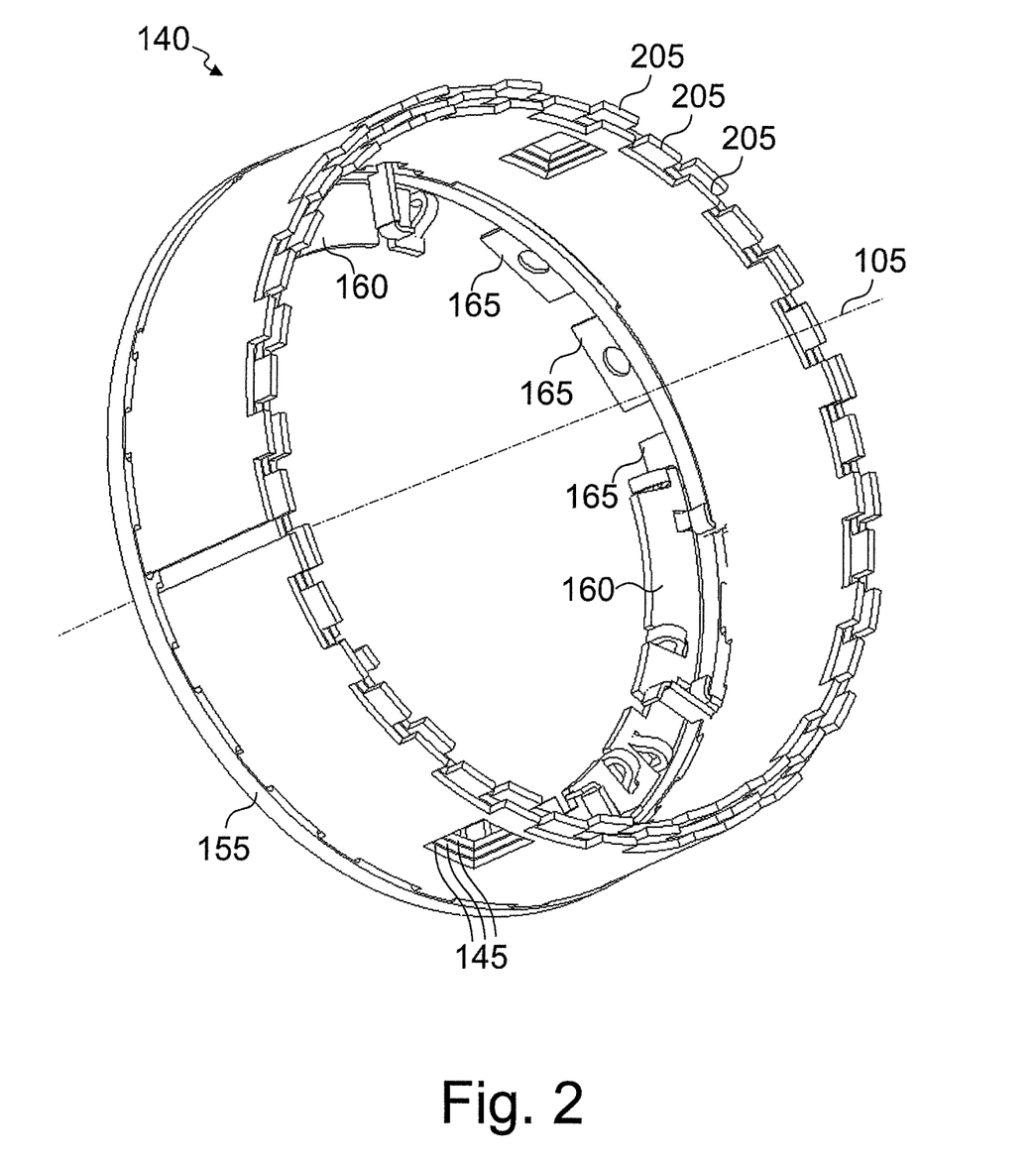
FIG. 2 is an interconnection arrangement of the electric machine of FIG. 1.

FIG. 2 shows an interconnection arrangement 140 of an electric machine 100 of the type shown in FIG. 1. In this case, the viewing direction is reversed and proceeds from the axial side on which the magnetic conducting element 130 is arranged in FIG. 1. The carrier element 150 is not shown in FIG. 2.

At an axial end remote of the cover element 155, axial projections 205, which could also be called fingers or tines, are formed in each instance at the switching rings 145 so that the switching rings 145 are formed as crowns. Projections 205 preferably extend in each instance between two planes which are perpendicular to the rotational axis 105 and which are spaced apart from one another axially. Flanks of the projections 205 preferably extend in axial direction. The projections 205 are preferably evenly distributed in circumferential direction.

Figure 3:
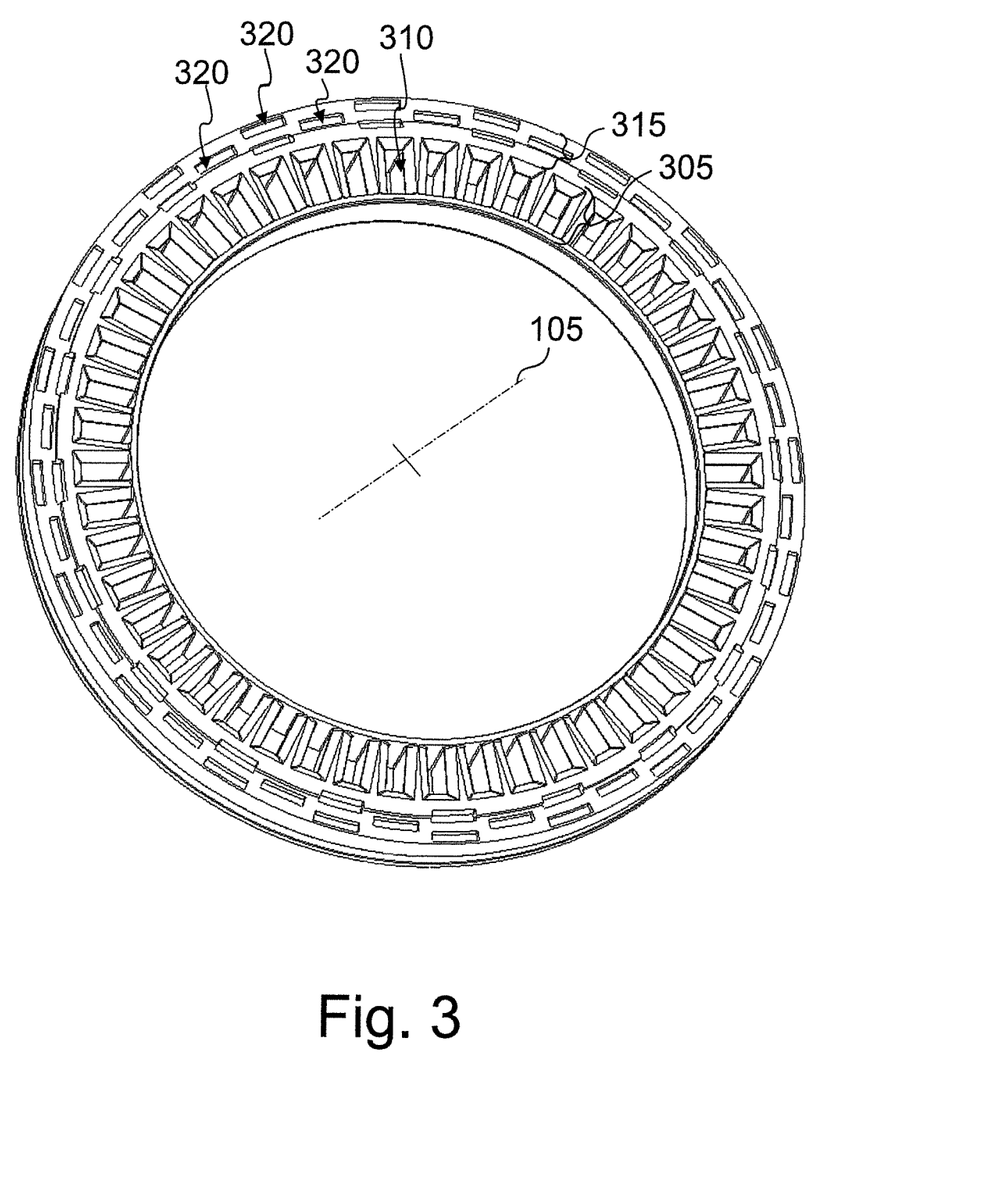
FIG. 3 is an embodiment form of a carrier element for the interconnection arrangement of FIG. 2.

FIG. 3 shows a carrier element 150 for the interconnection arrangement 140 of FIG. 2 in an exemplary embodiment form. A quantity of cutouts 310 is provided in a radially inner window region 305 for axial passage of an end of a conductor piece of a winding 120. The cutouts 310 are arranged in an offset manner on a circumference around the rotational axis 105 and preferably have rectangular or trapezoidal cross sections, in particular in case the conductor pieces likewise have rectangular or trapezoidal cross sections. A plurality of grooves 320 are provided in a radially outer fastening region 315 for receiving the projections 205 of the switching rings 145. Grooves 320 run along a circumference around rotational axis 105. There can be as many different circumferences as there are switching rings 145. The grooves 320 of a circumference are adapted to receive the projections 205 of an associated switching ring 145. The grooves 320 are arranged in the carrier element 150 in axial direction such that at least one of the projections 205 is supported in a positively engaging manner in radial direction radially inward and/or outward, further preferably at least one of the projections 205 is supported in a positively engaging manner in a first circumferential direction, and still further preferably at least one of the projections 205 is supported in a positively engaging manner in a second circumferential direction. Further, the carrier element 150 supports the associated switching ring 145 in an axial direction.

The distribution of the grooves 320 of a switching ring 145 in circumferential direction corresponds generally to that of the associated switching ring 145. The arrangement of the grooves 320 and projections 205 can permit one or more predetermined rotational positions between the switching ring 145 and the carrier element 150.

Figure 4:
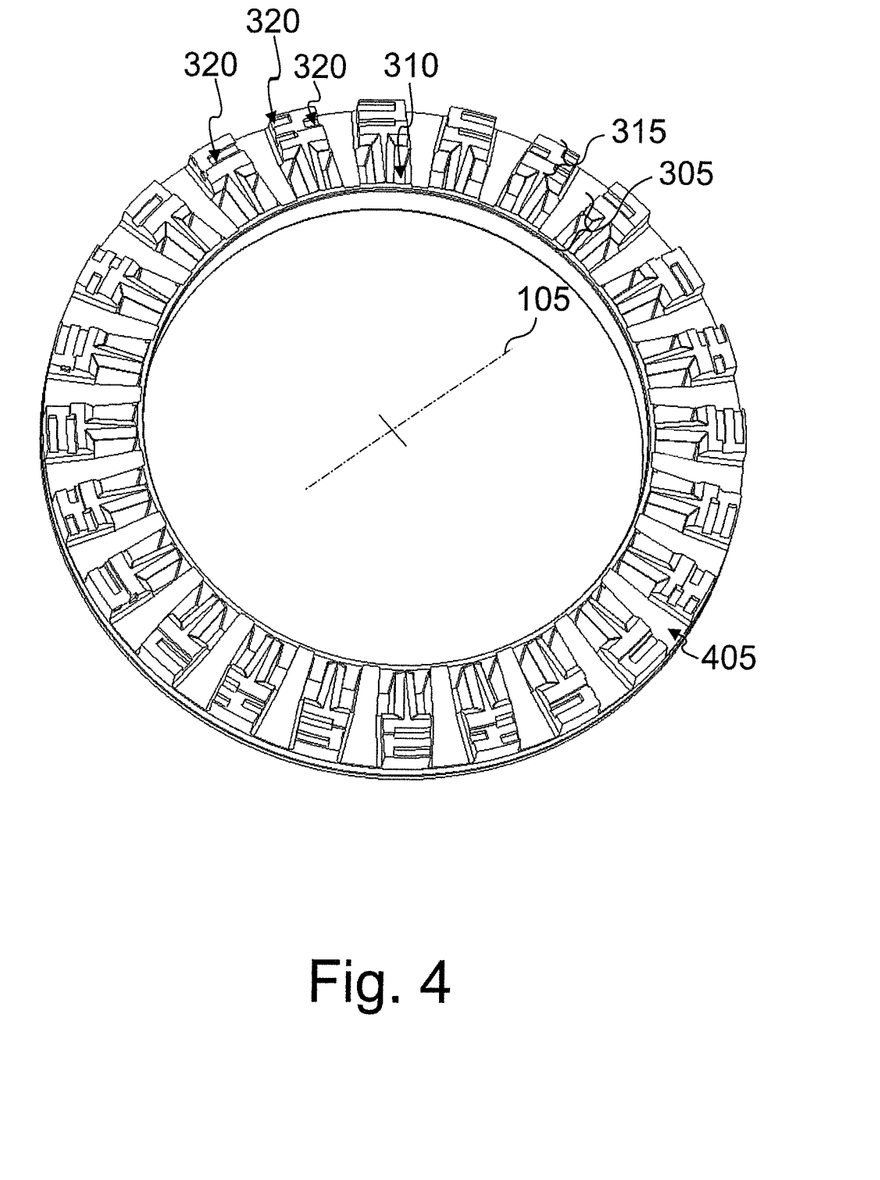
FIG. 4 is a carrier element for the interconnection arrangement of FIG. 2.

FIG. 4 shows a carrier element 150 for the interconnection arrangement 140 of FIG. 2 in a further embodiment form. In this case, additional channels 405 are arranged in radial direction in the carrier element 150. The channels 405 can widen radially outward and are adapted to guide a fluid flow in radial direction. In the depicted embodiment form, the channels 405 are formed so as to be open at the carrier element 150 in an axial direction which faces the switching rings 145. The channels 405 can be limited later in this direction through the switching rings 145. In this embodiment form, portions of some grooves 320 can partially coincide, respectively, with one of the channels 405 such that the groove 320 in question is effectively smaller in circumferential direction. A projection 205 corresponding to this can follow this reduction in size.

Figure 5:
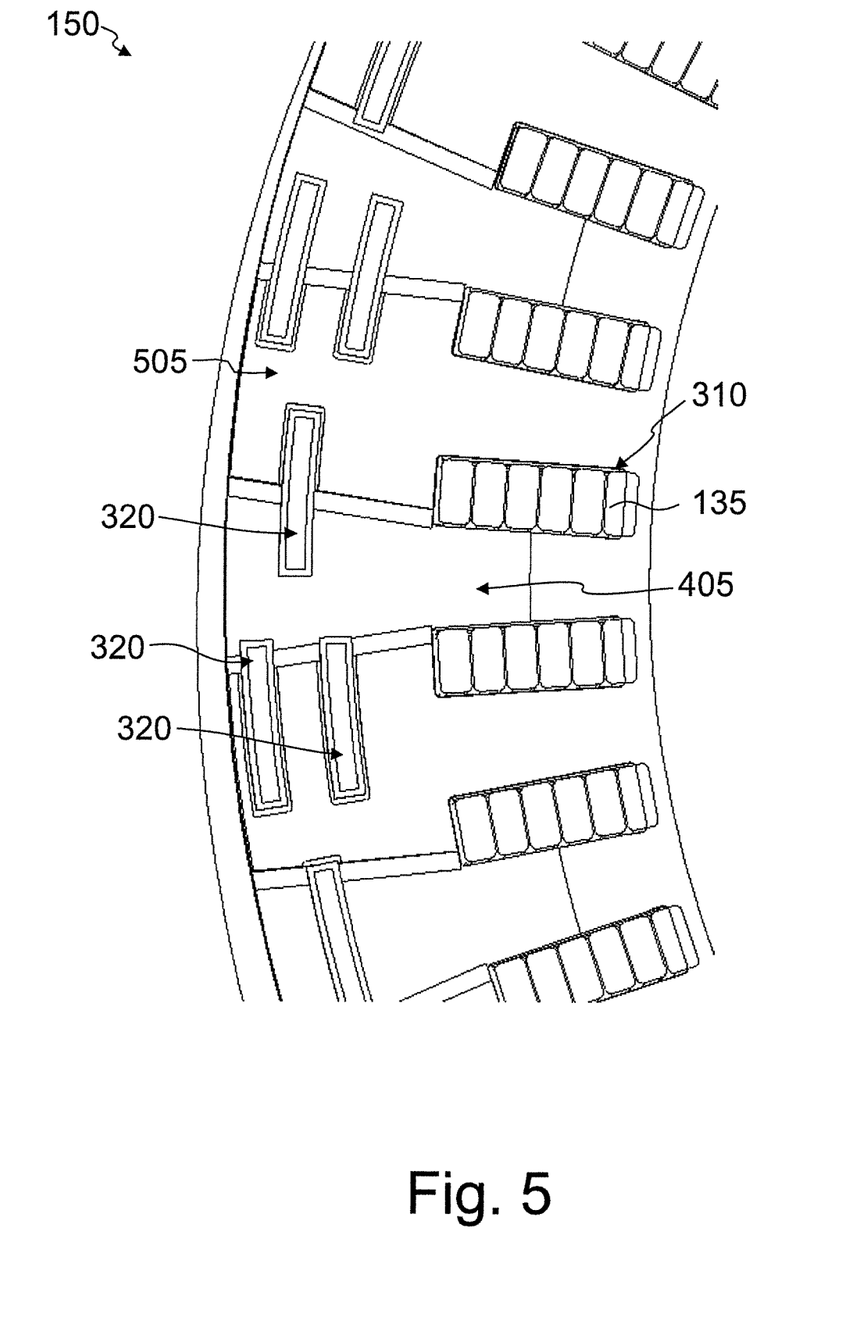
FIG. 5 is an axial view of the carrier element of FIG. 4.

FIG. 5 shows an axial view of the carrier element 150 in the exemplary embodiment form of FIG. 4. Axial portions of the hairpin elements 135, which each have a rectangular cross section are clearly discernable. In the area of the switching rings 145, it is preferable that grooves 320 of radially adjacent switching rings 145 are offset relative to one another so as to be free of radial overlapping as far as possible. Grooves 320 of switching rings 145, which are not directly adjacent—the radially innermost and radially outermost of three switching rings 145 in the view in FIG. 5—can overlap one another in radial direction and also completely as is shown. It is further preferable that a radial portion 505 having no grooves is located between grooves 320 which are adjacent in circumferential direction and associated with different switching rings 145. A portion 505 of this kind can lie partially or completely in the area of channel 405.

Figure 6:
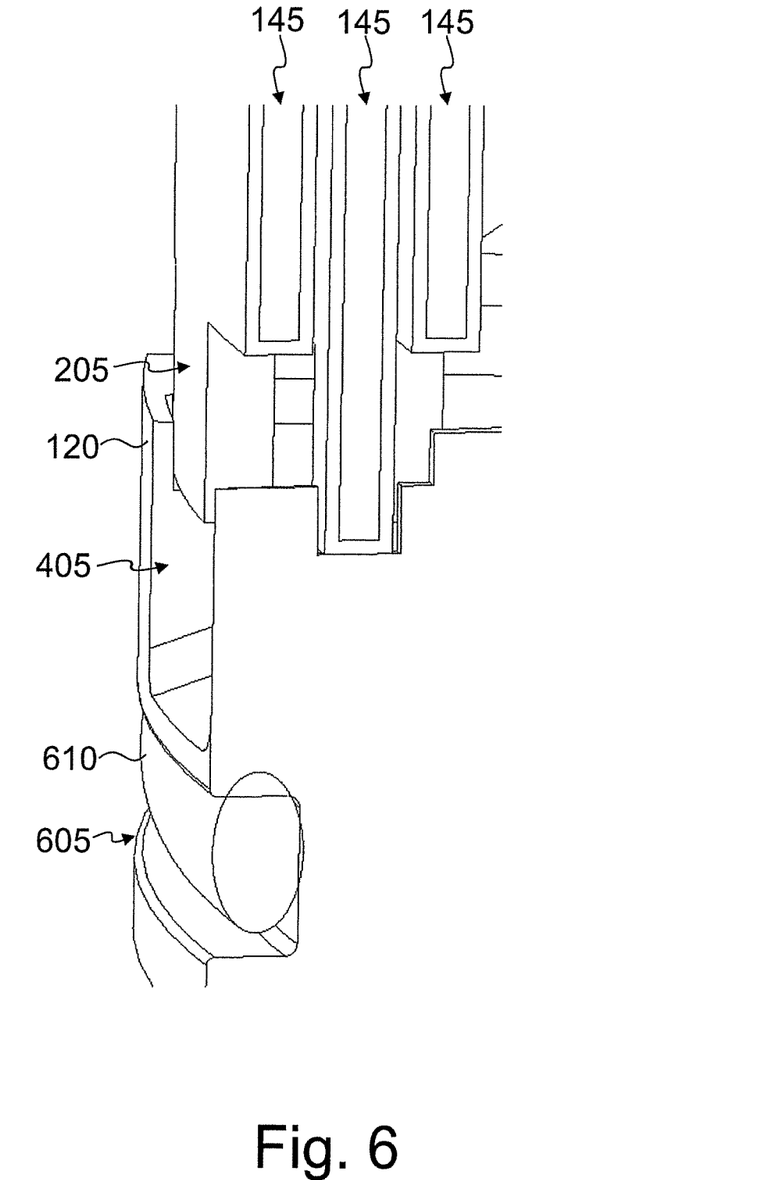
FIG. 6 is a sectional view through the interconnection arrangement of FIG. 2.

FIG. 6 shows a sectional view through the interconnection arrangement 140 of FIG. 2 in a first embodiment form. The rotational axis 105 (not shown) runs perpendicularly in this view. A radial groove 605 is provided axially below a channel 405 (see FIG. 4) for receiving a sealing element 610 constructed in this instance as an O-ring, for example. The sealing element 610 can seal radially towards the magnetic conducting element 130 of the stator 110 of the electric machine 100.

Figure 7:
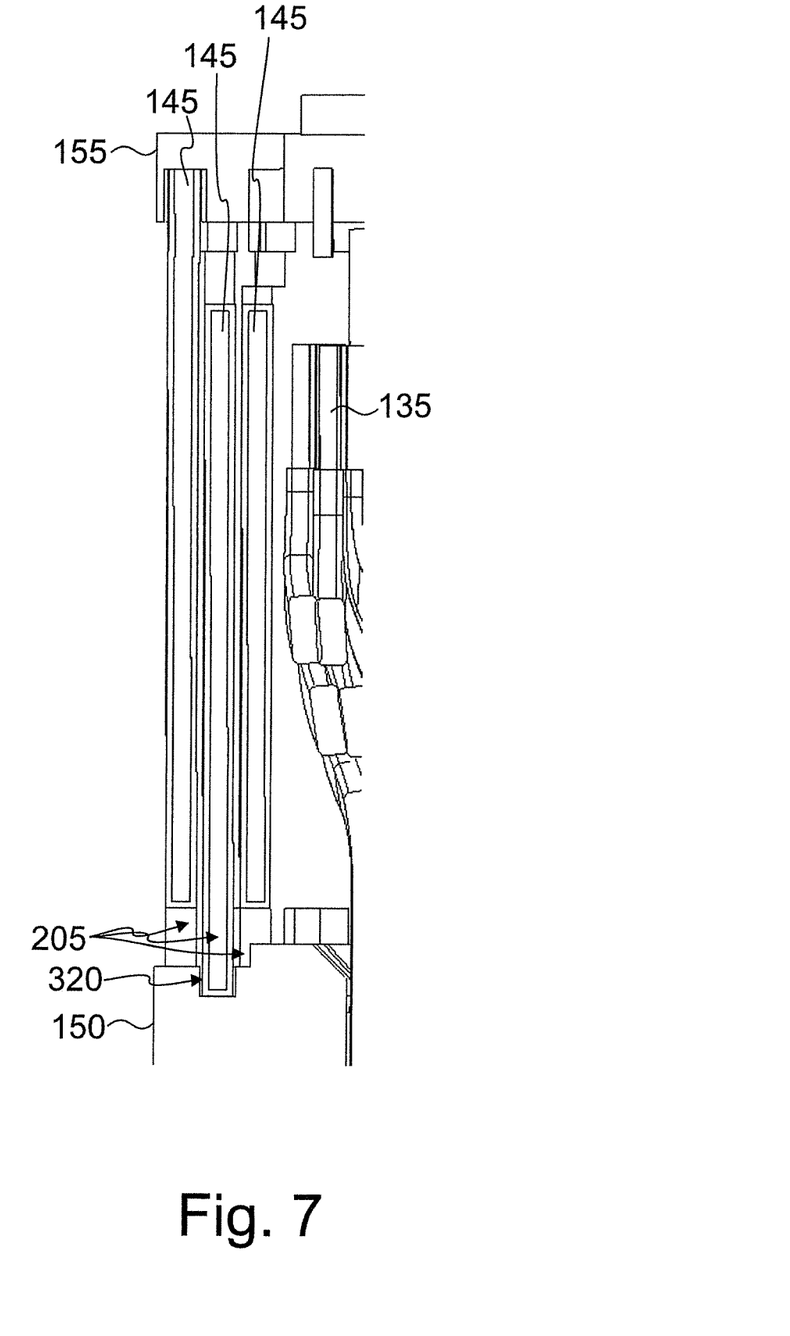
FIG. 7 is a sectional view through the interconnection arrangement of FIG. 2.

FIG. 7 shows a section through the interconnection arrangement 140 of FIG. 2 in a second embodiment form in a view similar to that in FIG. 6. In this instance, no radial channels 405 are provided (compare FIG. 3). The axial ends of the visible hairpin elements 135 are bent radially outward by a predetermined amount after the arrangement of the carrier element 150.

Figure 8:
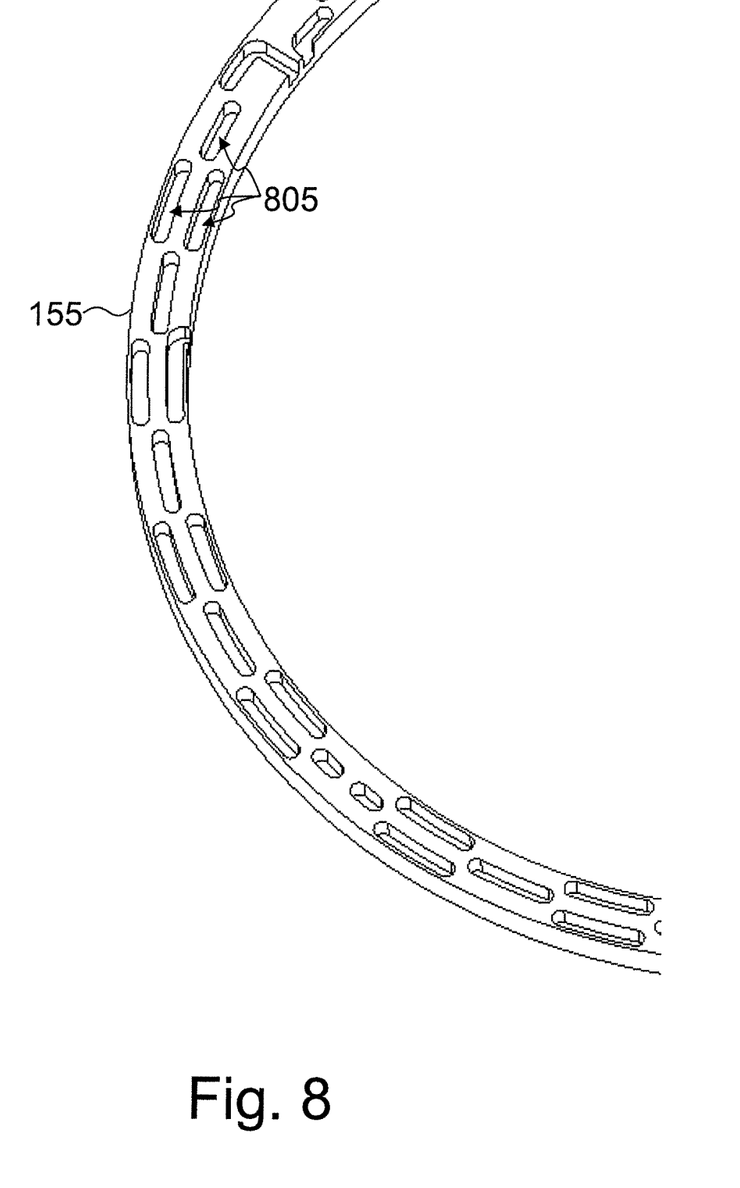
FIG. 8 is a cover element for an interconnection arrangement according to FIG. 2.

FIG. 8 shows a cover element 155 for an interconnection arrangement 140 of the type shown in FIG. 2. Cover element 155 carries axial grooves 805 modeled after the axial grooves 320 in carrier element 150. Grooves 805, which are associated with the same switching ring 145, are again located on the same circumference around rotational axis 105. The switching rings 145 preferably have corresponding projections 205 which can engage in a positive connection in grooves 805. In addition, projections 205 can be glued into grooves 805. Variants which have been described with reference to the positively engaging connection between switching rings 145 and carrier element 150 can also be used in this instance.

Figure 9:
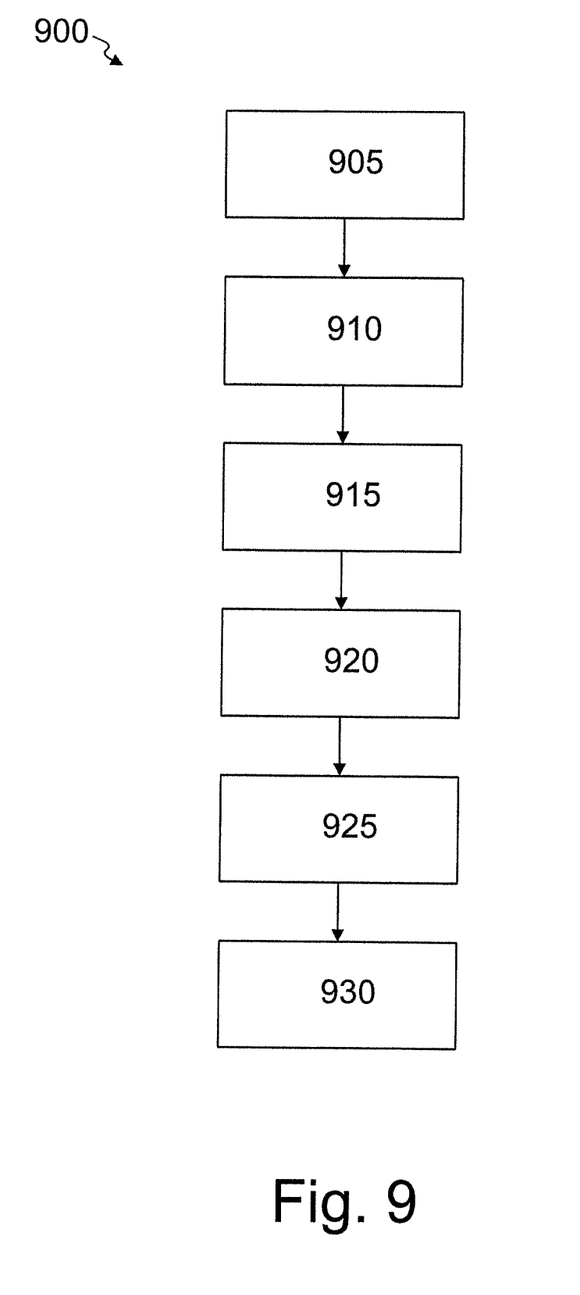
FIG. 9 is a flowchart for a process for assembling an interconnection arrangement.

FIG. 9 shows a flowchart of a process 900 for assembling an interconnection arrangement 140 of the type shown in FIG. 2. The time sequence of the process steps shown therein is only meant as an example. This means that the process steps can also be carried out in a different sequence if required or by choice insofar as this is useful and is not impeded for some other reason.

In a first step 905, the magnetic conducting element 130 is provided. For this purpose hairpin elements 135 is bent in a U-shape or provided in some other way. In a step 910, the hairpin elements 135 is inserted axially into the magnetic conducting element 130.

In a step 915, the carrier element 150 is preferably fitted axially to ends of the hairpin elements 135 so that the latter extend though the cutouts 310. The axial ends of the hairpin elements 135 can then be suitably bent, for which purpose they are usually placed in circumferential direction around rotational axis 105 and, if necessary, directed radially and/or axially in such a way that end portions which are associated with one another are guided together. Subsequently, in a step 925 the switching rings 945 is placed axially on the axial end of the stator 110 one after the other or all at once so that projections 205 of the switching rings 145 engage axially in associated grooves 320 of carrier element 150. In so doing, electrical connections of the switching rings 145 are guided together with predetermined ends of the hairpin elements 135. Optionally, the cover element 155 and/or the neutral switching ring 160 are also placed on axially.

In a step 930, the ends of the hairpin elements 135 are welded together and/or welded to connections of the switching rings 145, 160. This step can also be split, so that the ends of the hairpin elements 135 are already welded together prior to step 925, i.e., before arranging the switching rings 145. Welding is preferably carried out by means of laser.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An interconnection arrangement for an electric machine having a plurality of phases, wherein a winding is associated with each phase, the interconnection arrangement comprising:
    an annular carrier element having a plurality of axial cutouts, each of the plurality of axial cutouts configured for passage of a portion of a winding,
    wherein the annular carrier element has a plurality of axial grooves that extend, respectively, on a portion of a circumference of the annular carrier element,
    wherein an outer circumferential and an inner circumferential surface of the annular carrier element are uninterrupted; and
    a plurality of concentrically arranged, hollow-cylindrical switching rings, each hollow-cylindrical switching ring configured to contact a respective winding,
    wherein respective grooves associated with the hollow-cylindrical switching rings that are radially adjacent are offset in a circumferential direction and respective grooves associated with the hollow-cylindrical switching rings that are radially alternating overlap in the circumferential direction,
    wherein the annular carrier elemene and the hollow-cylindrical switching rings are configured to radially positively engage one inside the other in an axial contact zone.

2. The interconnection arrangement according to claim 1, wherein the plurality of axial cutouts of the annular carrier element are configured to allow respective axial ends of hairpin windings to pass through.

3. The interconnection arrangement according to claim 1, wherein one of the hollow-cylindrical switching rings has corresponding axial projections configured to engage in the plurality of axial grooves.

4. The interconnection arrangement according to claim 3, wherein respective grooves associated with radially adjacent switching rings are offset in a circumferential direction such that projections of the switching rings are free from radial overlap.

5. The interconnection arrangement according to claim 1, wherein the plurality of axial grooves are distributed in the circumferential direction such that between adjacent projections of radially adjacent hollow-cylindrical switching rings in the circumferential direction there is a portion of the annular carrier element in the circumferential direction in which there are no grooves.

6. The interconnection arrangement according to claim 1, wherein the annular carrier element has a plurality of radial channels configured for passage of a fluid.

7. The interconnection arrangement according to claim 1, further comprising:
a cover element for axially contacting an axial end of the switching rings which is remote of the annular carrier element,
wherein the cover element and the switching rings are configured to radially positively engage one inside the other.

8. The interconnection arrangement according to claim 7, further comprising:
a further switching ring configured to contact a respective winding of the electric machine,
wherein the further switching ring is arranged radially inside the cover element.

9. An electric machine with an interconnection arrangement comprising:
an annular carrier element having a plurality of axial cutouts, each of the plurality of axial cutouts configured for passage of a portion of a winding,
wherein the annular carrier element has a plurality of axial grooves that extend, respectively, on a portion of a circumference of the annular carrier element; and
a plurality of concentrically arranged, hollow-cylindrical switching rings, each hollow-cylindrical switching ring configured to contact a respective winding,
wherein respective grooves associated with the hollow-cylindrical switching rings that are radially adjacent are offset in a circumferential direction and respective grooves associated with the hollow-cylindrical switching rings that are radially alternating overlap in the circumferential direction,
wherein the annular carrier element and the hollow-cylindrical switching rings are configured to radially positively engage one inside the other in an axial contact zone.

10. A process for assembling an interconnection arrangement in an electric machine with a plurality of phases, wherein a winding is associated with each phase, wherein the process includes:
axially fitting an annular carrier element to axial portions of the winding such that the axial portions extend through cutouts of the carrier element;
wherein the annular carrier element has a plurality of axial grooves that extend, respectively, on a portion of a circumference of the annular carrier element,
wherein respective grooves associated with radially adjusted hollow-cylindrical switching rings are offset in a circumferential direction and respective grooves associated with radially alternating hollow-cylindrical switching rings overlap in the circumferential direction;
bending the axial portions of the winding in circumferential direction;
axially fitting the plurality of hollow-cylindrical switching rings concentrically with respect to the carrier element; and
electrically connecting each switching ring to axial portions of an associated winding.

* * * * *